(12) United States Patent
Malinowski et al.

(10) Patent No.: US 11,550,026 B2
(45) Date of Patent: Jan. 10, 2023

(54) METHOD, APPARATUS, AND SYSTEM FOR TRACKING ARBITRARY MOTION OF AN INSPECTION PROBE IN MULTIPLE DIMENSIONS

(71) Applicant: Structural Integrity Associates, Inc., Huntersville, NC (US)

(72) Inventors: Owen M. Malinowski, Gilbertsville, PA (US); Jason K. Van Velsor, Julian, PA (US)

(73) Assignee: STRUCTURAL INTEGRITY ASSOCIATES, INC., San Jose, CA (US)

(*) Notice: Subject to any disclaimer, the term of this patent is extended or adjusted under 35 U.S.C. 154(b) by 733 days.

(21) Appl. No.: 16/357,819

(22) Filed: Mar. 19, 2019

(65) Prior Publication Data

US 2019/0293745 A1 Sep. 26, 2019

Related U.S. Application Data

(60) Provisional application No. 62/647,164, filed on Mar. 23, 2018.

(51) Int. Cl.
*G01S 5/22* (2006.01)
*G01P 13/00* (2006.01)

(52) U.S. Cl.
CPC ............... *G01S 5/22* (2013.01); *G01P 13/00* (2013.01)

(58) Field of Classification Search
CPC .................................. G01S 5/22; G01P 13/00
USPC ........................................................ 367/127
See application file for complete search history.

(56) References Cited

U.S. PATENT DOCUMENTS

| | | | |
|---|---|---|---|
| 4,160,386 A | 7/1979 | Jackson et al. | |
| 5,524,627 A | 6/1996 | Passi | |
| 5,851,183 A * | 12/1998 | Bucholz | A61B 8/5238 600/425 |
| 5,952,577 A | 9/1999 | Passi | |
| 6,141,293 A * | 10/2000 | Amorai-Moriya | G01S 5/186 367/127 |
| 6,487,516 B1 | 11/2002 | Amorai-Moriya et al. | |
| 6,710,719 B1 | 3/2004 | Jones et al. | |
| 7,012,521 B2 | 3/2006 | Fardin et al. | |
| 7,283,423 B2 | 10/2007 | Holm et al. | |
| 7,684,282 B2 * | 3/2010 | Rolet | G01S 5/30 367/124 |
| 7,760,194 B2 | 7/2010 | Sakurai | |
| 8,134,888 B2 | 3/2012 | Han et al. | |
| 2019/0154439 A1* | 5/2019 | Binder | G01B 11/26 |

* cited by examiner

*Primary Examiner* — Aditya S Bhat
(74) *Attorney, Agent, or Firm* — Nexsen Pruet, PLLC; Seth Hudson

(57) ABSTRACT

The present invention provides methods and systems for tracking motion in multiple dimensions, including multiple dimensions, including a transmitter probe fixture, a receiver array, and an electronic control unit.

6 Claims, 4 Drawing Sheets

METHOD, APPARATUS, AND SYSTEM FOR TRACKING ARBITRARY MOTION OF AN INSPECTION PROBE IN MULTIPLE DIMENSIONS

CROSS REFERENCE TO RELATED PATENT APPLICATION

The present patent application/patent claims the benefit of priority of U.S. Provisional Patent Application No. 62/647,164, filed on Mar. 23, 2018, and entitled "METHOD, APPARATUS, AND SYSTEM FOR TRACKING ARBITRARY MOTION OF AN INSPECTION PROBE IN MULTIPLE DIMINSIONS," the contents of which are incorporated in full by reference herein.

FIELD OF THE INVENTION

The present invention relates generally to a system and method for tracking arbitrary motion of an inspection probe in at least one dimension, and more generally, relates to a system and method for tracking arbitrary motion of an inspection probe in multiple dimensions consisting of a transmitter probe fixture, a receiver array, and an electronic control unit.

BRIEF SUMMARY OF THE INVENTION

According to an embodiment of the present invention, the disclosed invention is a non-mechanized position and orientation encoding technology designed for use with nondestructive evaluation (NDE) equipment. The invention enables an operator to manipulate a probe by hand while maintaining a digital record of the position and orientation of the probe at different and random locations on an object through a combination of devices that utilize airborne sound tracking signals and that measure body forces and motion using gyroscopes, accelerometers, and magnetometers. For many applications, the invention can be thought of as a fast and compact alternative to cumbersome and complicated automated, robotic, or otherwise mechanized inspection and position encoding equipment. To replace all the tracks, motors, motion controllers, probe carts, and other equipment used for traditional automated inspections, the disclosed invention uses air-borne ultrasound to track the position of a transmitting probe relative to a set, or array, of stationary receiver sensors. In this way, the transmitting probe can be attached to any of a variety of NDE probes and the absolute position of the NDE probe, relative to the receiver sensors, can be tracked multi-dimensionally. In the described embodiment, the disclosed invention can track x (axial) position, y (circumferential) position, probe rotation about 3 axes, and can compensate for pipe geometry. In another embodiment, the disclosed invention is also capable of tracking position in the z (radial) dimension.

According to another embodiment of the present invention, a system for tracking motion in multiple dimensions that includes a transmitter probe fixture, a receiver array, and an electronic control unit.

According to yet another embodiment of the present invention, a system for tracking motion in multiple dimensions wherein the transmitter probe fixture includes a base structure having a front base portion and two legs extending parallel therefrom, a ramp portion disposed on the two legs, and at least one inspection probe disposed on the ramp portion.

According to yet another embodiment of the present invention, a system for tracking motion in multiple dimensions, wherein the system includes two or more inspection probes.

According to yet another embodiment of the present invention, a system for tracking motion in multiple dimensions that includes an array that contains a plurality of sections that are rotationally engaged to each other.

According to yet another embodiment of the present invention, a system for tracking motion in multiple dimensions that includes an array that contains a hingedly connected top providing access to a cavity located within the array.

According to yet another embodiment of the present invention, a method for tracking motion in multiple dimensions that includes a probe fixture, a receiver array, and an electronic control unit. The receiver array is positioned around the external surface of a pipe, a flat surface, or the like. An ultrasonic pulse is transmitted from a transmitter on the transmitter probe fixture that is received by at least one receiver in the receiver array. A measurement is taken for the time it takes for the ultrasonic pulse to travel along a path to the receiver or receivers and multiplying the time-of-flight measurement by the speed of sound in air and applying a bilateration calculation for two dimensions, or a trilateration calculation, for three dimensions, to determine the relative location of the transmitter.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Referring now specifically to the drawings, a system for tracking arbitrary motion of an inspection probe in multiple dimensions is illustrated in FIGS. 1-4 through its components parts. The system includes a transmitter probe fixture 10, a receiver array 12, and an electronic control unit 14.

Figure 1:
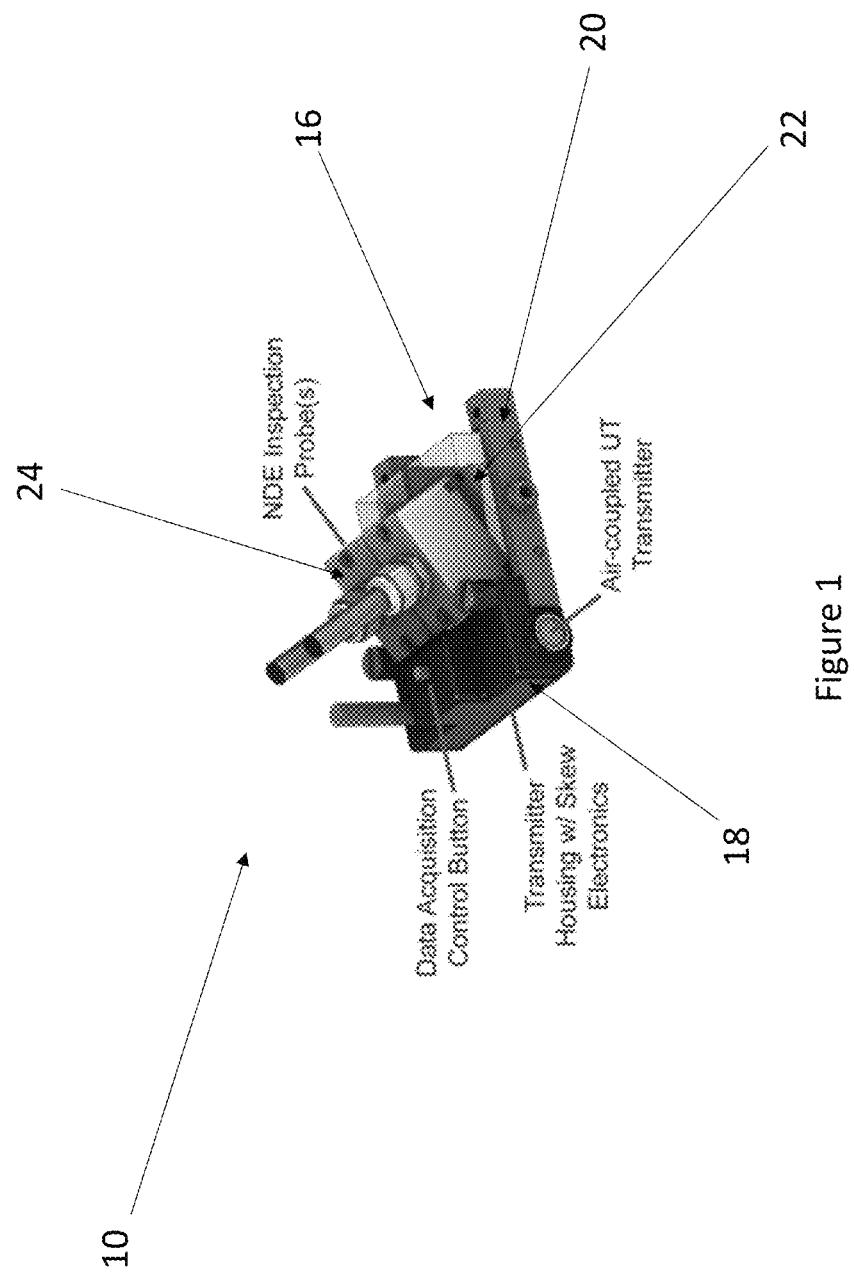
FIG. 1 is a perspective view of an embodiment of a transmitter probe fixture.

An example of a possible embodiment of a transmitter probe fixture is shown in FIG. 1. The probe fixture 10 contains a base structure 16 consisting of a front base portion 18 and two legs 20 extending outwardly and parallel from a back portion of the front base portion and forming an opening therein. The front base portion 18 houses a transmitter and skew electronics. A data acquisition control button is disposed on a top portion of the front base portion 18. An air coupled UT transmitter is positioned on a side portion of the front base portion 18.

A ramp portion 22 may be disposed on the top side of the legs 20 and over top the opening formed between the two legs 20. The ramp portion 22 consists of a flat bottom portion engaged to the top side of each leg 20. The front side of the ramp portion 22 is angled upwards from the top side of the legs 20 and culminates at a flat area. Inspection probes 24 are disposed on the angled front side of the ramp portion 22, resulting in the probes 24 having an angled orientation. As illustrated in FIG. 1, two inspection probes are included on the probe fixture 10. However, the probe fixture 10 may contain one probe 24, two or more probes 24, or a plurality of probes 24.

The exemplified embodiment may contain multiple sensors for determining the axial position, circumferential position, and skew of the fixture. In one embodiment, these sensors include at least one acoustic source, gyroscope, accelerometer, and magnetometer. The transmitter probe fixture is typically affixed to an NDE sensor that is being used to conduct an examination, such as a phased array ultrasonic testing (PAUT) probe, an eddy current testing (ECT) probe, or any of several other kinds of NDE sensors. In another embodiment, the transmitter probe fixture 10 may contain multiple acoustic sources oriented in different directions, such that the inspection probe 24 can be oriented in different directions relative to the receiver array 12. As an example, this would allow both sides of a girth weld to be examined without relocating the receiver array 12.

Figure 2:
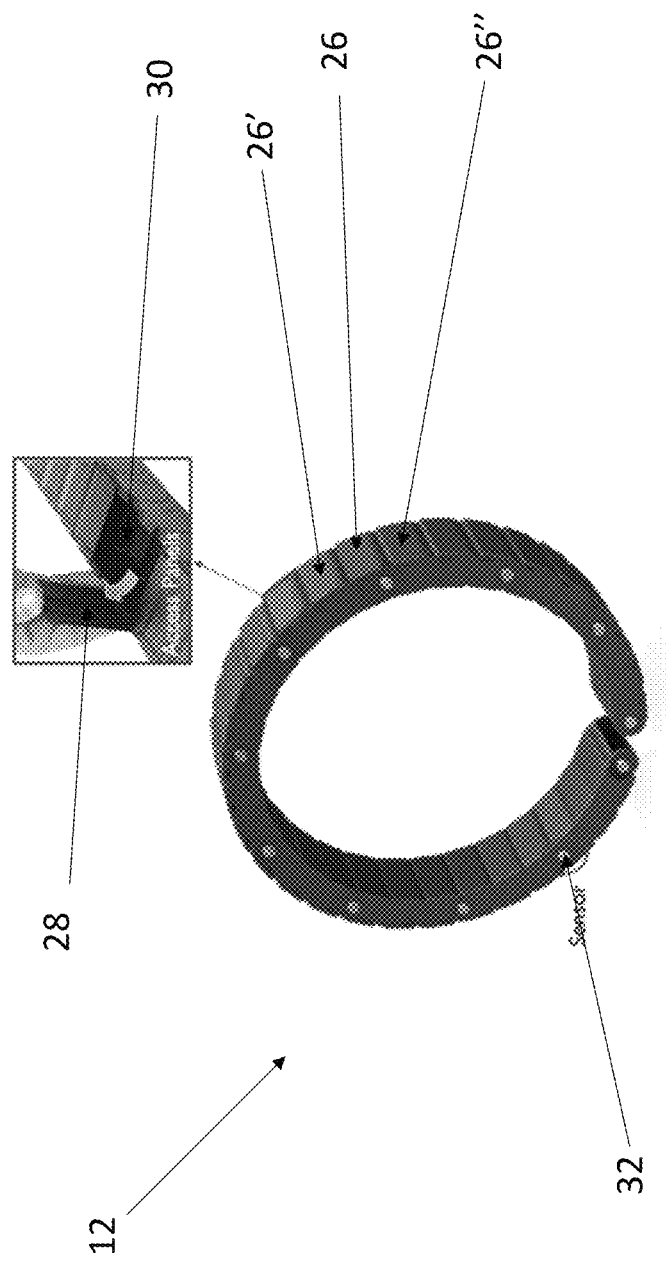
FIG. 2 is a perspective view and a detail of an embodiment of a receiver array.

The receiver array 12, as shown in FIG. 2, is generally circularly shaped and acts as a collar that may be wrapped around a pipe circumference, stretched along a pipe axis, or otherwise placed on a flat or curved surface depending on the application. In the exemplified embodiment, all wiring for the receiver array is contained within the array housing, with a single connection point to the electronics control unit. In one possible embodiment, the receiver array may be designed to achieve full circumferential coverage on specific pipe diameters; however, any receiver array may be used for partial coverage on pipe diameters that are larger than the nominal diameter of the receiver array, up to a flat surface. The receiver array 12 may consist of one, two or more, or a plurality of acoustic probes 24 for receiving transmitted pulses from the acoustic source located on the transmitter probe attachment.

The array 12 may consist of a plurality of sections 26 that are pivotally engaged to each other. The side of each section 26 consists of a frustoconically shaped upper section and a correspondingly recessed bottom portion. The frustoconically shaped upper portion is designed to be received within the correspondingly recessed bottom portion of the adjacent section 26'. Likewise, the recessed bottom portion receives a frustoconically shaped upper portion of the section 26" behind it. The bottom portion of each section 26 is designed to contact the outer surface of the pipe or the like. The top portion of the section 26 contains a hingedly connected top 28 that when opened, exposes an internal cavity 30. Sensors 32 are disposed on the side portion of the array 12. As illustrated in FIG. 2, a plurality of sensors 32 are disposed an equal distance apart on the side portion of the array 12.

Figure 3:
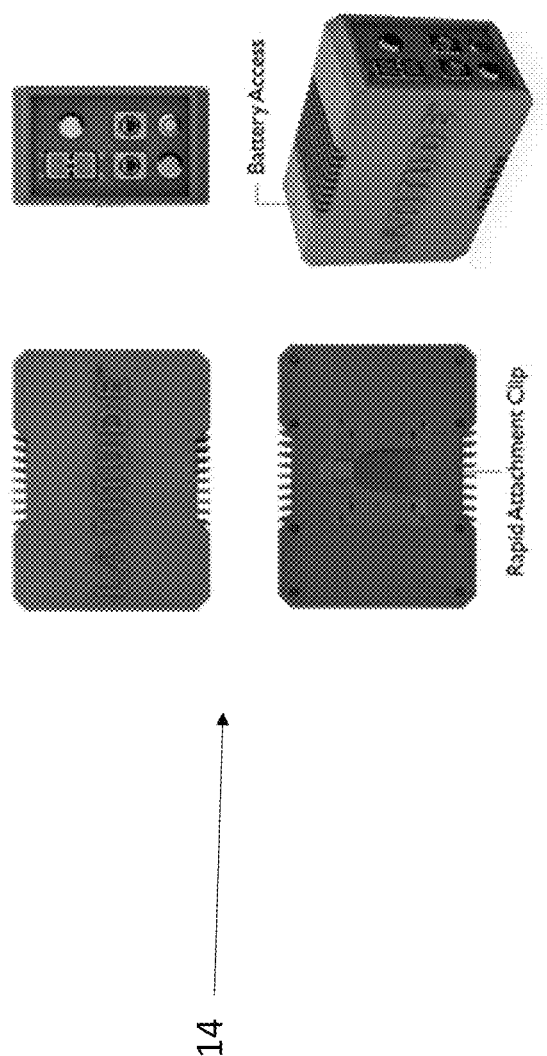
FIG. 3 is a top view, bottom view, side view and perspective view of an exemplary embodiment of an electronic control unit.

The electronic control unit contains components for generating, receiving, and digitizing the signals sent by the acoustic transmitter and received by the receiver array probes. An example embodiment of the electronic control unit is shown in FIG. 3. In the exemplified embodiment, the electronic control unit 14 also contains a computer processor for processing the received signals, calculating the position information, and communicating with the external NDE inspection instrumentation. Furthermore, the exemplified embodiment may also contain microcontrollers, amplifiers, and other electronic circuits for controlling the operation of the transmitter attachment probe and receiver array collar.

Figure 4:
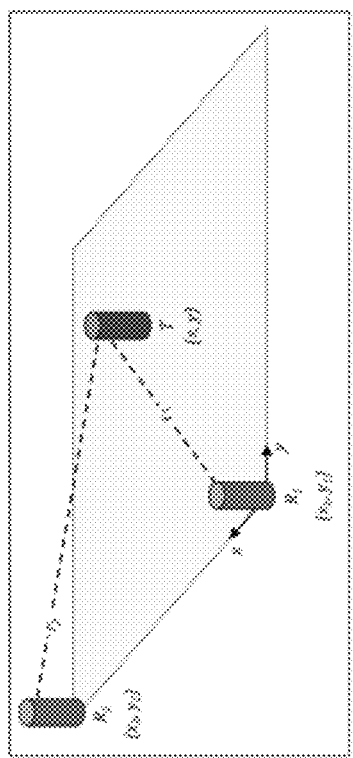
FIG. 4 is a concept for calculating the position of a transmitter relative to the two receivers.

One concept for computing the transmitter probe position from the received ultrasonic signals is illustrated in FIG. 4. A minimum of one transmitter and two receivers are required for the exemplified concept. The two green cylinders ($R_1$ and $R_2$) in FIG. 4 represent the air-borne ultrasound receivers and the red cylinder (T) represents the air-borne ultrasound transmitter. The transmitter emits an ultrasonic pressure pulse that can be envisioned to travel along paths $r_1$ and $r_2$ to Receiver $R_1$ and Receiver $R_2$, respectively. By measuring, with sub-microsecond precision, the time it takes for the ultrasonic pulse to travel along both paths, the relative location of the transmitter can be determined by multiplying the time-of-flight measurement by the speed of sound in air and applying a position calculation algorithm, such as bilateration or trilateration, to the results. The exemplified embodiment of the disclosed invention can complete this calculation hundreds of times per second, providing a real-time absolute position measurement. With this type of "absolute" position measurement, the probe can be removed from the pipe surface, placed in a different location, and the system will always know the true position of the probe, relative to the receiver array. It does not rely on accumulated encoder "counts" to estimate the position, like traditional scanning systems.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A system for tracking motion in multiple dimensions, comprising: a transmitter probe fixture containing at least one acoustic transmitter; a first receiver array and a second receiver array, the first and second receiver array consist of one or more acoustic probes for receiving transmitted ultrasonic pressure pulses from the acoustic transmitter of the transmitter probe fixture, and an electronic control unit, wherein the acoustic transmitter of the transmitter probe fixture emits an ultrasonic pressure pulse that travels along a first path to the first receiver array and a second path to the second receiver array, the time period elapsed between the time the ultrasonic pressure pulse was emitted by the transmitter probe fixture to the time received by the first receiver array is measured and the time period elapsed between the time the ultrasonic pressure pulse was emitted by the transmitter probe fixture and the time received by the second receiver array is measured, and determining the location of the transmitter probe fixture by multiplying the time period elapsed by the speed of sound in air and applying a bilateral position calculation algorithm.

2. The system for tracking motion in multiple dimensions according to claim 1, wherein the transmitter probe fixture includes a base structure having a front base portion and two legs extending parallel therefrom, a ramp portion disposed on the two legs, and at least one inspection probe disposed on the ramp portion.

3. The system for tracking motion in multiple dimensions according to claim 1, wherein the system includes two or more inspection probes.

4. The system for tracking motion in multiple dimensions according to claim 1, wherein the first receiver array and the second receiver array contain a plurality of sections that are rotationally engaged to each other.

5. The system for tracking motion in multiple dimensions according to claim 1, wherein the first receiver array and the second receiver array consists of a plurality of sections pivotally engaged to each other, the side of each section consists of a frustoconically shaped upper portion is designed to be received within the correspondingly recessed bottom portion of an adjacent section, the bottom portion of each section is designed to contact the outer surface of a pipe and the top portion of each section contains a hingedly connected top that when opened, exposes an internal cavity.

6. A method for tracking motion in multiple dimensions, comprising: providing a probe fixture containing at least one acoustic transmitter, a first receiver array and a second receiver array consisting of a plurality of sections containing a cavity and a top portion, wherein the first receiver array and the second receiver array comprises one or more acoustic probes for receiving the transmitted pulses from the acoustic transmitter, and an electronic control unit; positioning the first receiver array and the second receiver array around the external surface of a pipe; transmitting an ultrasonic pressure pulse from a transmitter on the transmitter probe fixture along a first path to the first receiver array and along a second path to the second receiver array; receiving the first ultrasonic pressure pulse transmitted along the first path by the first receiver array; receiving the second ultrasonic pulse transmitted along the second path by the second receiver array; measuring the time elapsed between the time the ultrasonic pressure pulse was emitted by the transmitter probe fixture to the time received by the first receiver array and the time elapsed between the time the ultrasonic pressure pulse was emitted by the transmitter probe fixture to the time received by the second receiver array; multiplying the time elapsed by the speed of sound in air and applying a bilateration calculation to determine the relative location of the transmitter.

* * * * *